(12) United States Patent
Atchison

(10) Patent No.: US 11,499,744 B2
(45) Date of Patent: Nov. 15, 2022

(54) CONTROL BOARD SYSTEMS AND METHODS FOR DIAGNOSIS OF HVAC COMPONENTS

(71) Applicant: Johnson Controls Technology Company, Auburn Hills, MI (US)

(72) Inventor: Shaun B. Atchison, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/073,812

(22) Filed: Oct. 19, 2020

(65) Prior Publication Data
US 2021/0048219 A1 Feb. 18, 2021

Related U.S. Application Data

(63) Continuation of application No. 15/991,985, filed on May 29, 2018, now Pat. No. 10,830,488.

(60) Provisional application No. 62/674,435, filed on May 21, 2018.

(51) Int. Cl.
| | |
|---|---|
| *F24F 13/14* | (2006.01) |
| *F24F 11/56* | (2018.01) |
| *G01K 15/00* | (2006.01) |
| *G06F 3/0487* | (2013.01) |
| *F24F 11/63* | (2018.01) |
| *G01K 13/02* | (2021.01) |

(Continued)

(52) U.S. Cl.
CPC .......... *F24F 13/1426* (2013.01); *F24F 11/56* (2018.01); *F24F 11/63* (2018.01); *F24F 11/80* (2018.01); *G01K 13/02* (2013.01); *G01K 15/007* (2013.01); *G06F 3/0482* (2013.01); *G06F 3/0487* (2013.01)

(58) Field of Classification Search
CPC .. F24F 11/49; F24F 11/56; F24F 11/61; F24F 11/63; F24F 11/80; F24F 13/1426; F24F 2140/40; G01K 13/02; G01K 15/007; G06F 3/0482; G06F 3/0487
See application file for complete search history.

(56) References Cited

U.S. PATENT DOCUMENTS

| | | | |
|---|---|---|---|
| 5,485,466 | A | 1/1996 | Lyon |
| 7,129,851 | B1 | 10/2006 | Garnett |
| 7,831,338 | B1 | 11/2010 | Haydu |

(Continued)

*Primary Examiner* — Kidest Bahta
(74) *Attorney, Agent, or Firm* — Fletcher Yoder, P.C.

(57) ABSTRACT

The present disclosure includes an HVAC system that includes a plurality of dampers each corresponding to one building zone of a plurality of building zones, a plurality of sensors each corresponding to the one of the plurality of building zones, and a control board communicatively coupled with the plurality of dampers and sensors. The control board includes a plurality of status light sources, each corresponding to one damper the plurality of dampers, a plurality of communication light sources each corresponding to one sensor of the plurality of sensors, and a microcontroller programmed to control operation of equipment in the HVAC system. The microcontroller is configured to perform "a hardware test mode" to facilitate diagnosis of the plurality of dampers by causing the plurality of status light sources to sequentially execute a first light scheme or a second light scheme in response to instructions to the plurality of dampers.

20 Claims, 13 Drawing Sheets

(51) Int. Cl.
    *G06F 3/0482*     (2013.01)
    *F24F 11/80*     (2018.01)

(56) References Cited

U.S. PATENT DOCUMENTS

| | | |
|---|---|---|
| 8,109,101 B2 | 2/2012 | Taras et al. |
| 8,972,064 B2 | 3/2015 | Grabinger et al. |
| 9,310,091 B2 | 4/2016 | Hoglund et al. |
| 9,395,099 B2 | 7/2016 | Edwards et al. |
| 9,607,608 B2 | 3/2017 | Palanisamy |
| 9,874,364 B2 | 1/2018 | Bujak, Jr. et al. |
| 2005/0155367 A1 | 7/2005 | Shah |
| 2006/0086112 A1* | 4/2006 | Bloemer ............... F24F 3/153 62/176.6 |
| 2009/0326853 A1 | 12/2009 | Chen |
| 2010/0102136 A1* | 4/2010 | Hadzidedic ............. F24F 11/77 236/49.3 |
| 2016/0116177 A1 | 4/2016 | Sikora et al. |
| 2017/0343227 A1 | 11/2017 | Mowris |
| 2018/0106493 A1 | 4/2018 | Hoglund et al. |

\* cited by examiner

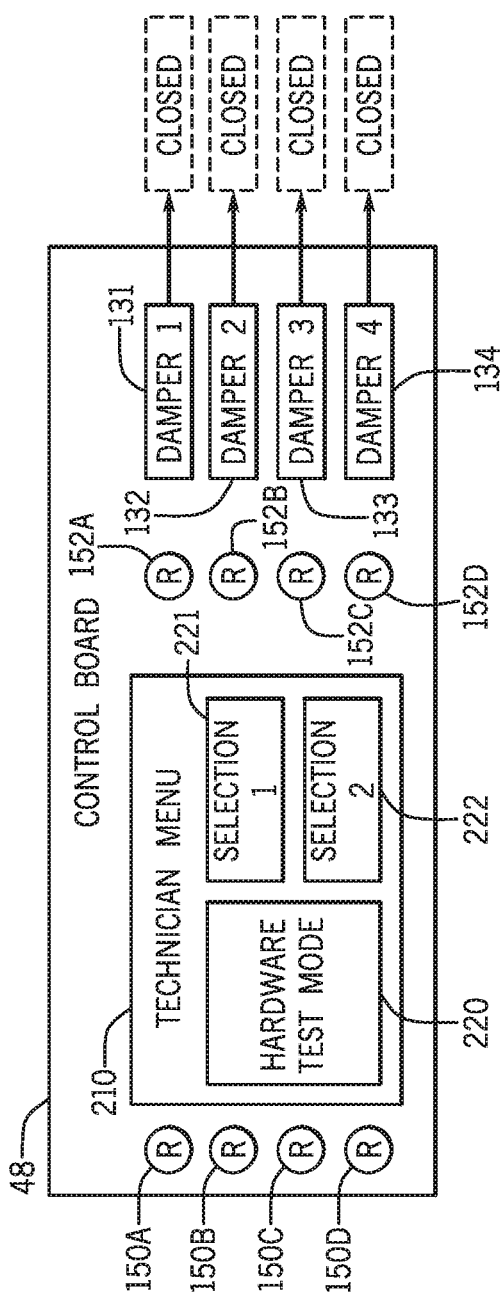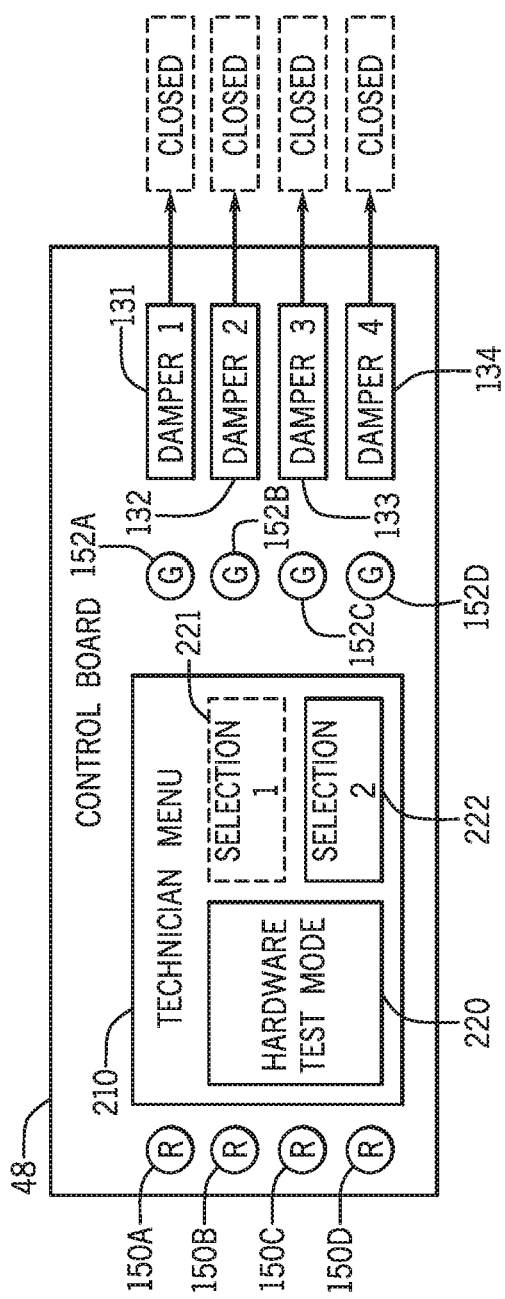

CONTROL BOARD SYSTEMS AND METHODS FOR DIAGNOSIS OF HVAC COMPONENTS

CROSS-REFERENCE TO RELATED APPLICATIONS

This application is a continuation of U.S. patent application Ser. No. 15/991,985, filed May 29, 2018, entitled "CONTROL BOARD SYSTEMS AND METHODS FOR DIAGNOSIS OF HVAC COMPONENTS," which claims priority to and the benefit of U.S. Provisional Application No. 62/674,435, filed May 21, 2018, entitled "CONTROL BOARD SYSTEMS AND METHODS FOR DIAGNOSIS OF HVAC COMPONENTS," which are hereby incorporated by reference in its entirety for all purposes.

BACKGROUND

The present disclosure generally relates to heating, ventilation, and air conditioning (HVAC) systems and, more particularly, to control systems that may be implemented in a HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally includes a control system to control and/or to coordinate operation of devices, such as equipment, machines, and sensors. For example, the control system may communicate sensor data and control commands with devices in the HVAC system. To facilitate communication, the control system may send and/or receive data according to a specific communication protocol. The control system may send a control command to actuate a HVAC device. However, in some instances, the HVAC device may not respond in accordance with the control command. Due to the fast passed nature of their work, the technicians operating the HVAC device may default to diagnosing the HVAC device as faulty. In some instances, as a result of this diagnosis, the HVAC device may be shipped off to a remote service center for fixing and to be replaced with a new device. After a series of diagnosis tests, the remote service center may determine that the HVAC device, originally assumed to be faulty, is properly functioning. Therefore, the HVAC device did not operate in accordance with the control command as a result of another issue. This misdiagnosis of the HVAC device may result in unwanted shipping costs to the remote service center, undesirable loss of productivity, and overall inefficient operation of the HVAC system. Thus, improving the diagnosis of the HVAC devices in the HVAC system may improve the efficiency of the HVAC system and reduce the HVAC devices replaced when they are properly functioning.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and air conditioning (HVAC) system includes a plurality of dampers each corresponding to one building zone of a plurality of building zones, a plurality of sensors each corresponding to the one of the plurality of building zones, and a control board communicatively coupled to the plurality of dampers and sensors. The control board includes a plurality of status light sources, each corresponding to one damper the plurality of dampers, a plurality of communication light sources each corresponding to one sensor of the plurality of sensors, and a microcontroller programmed to control operation of equipment in the HVAC system. The microcontroller is configured to perform "a hardware test mode" to facilitate diagnosis of the plurality of dampers by causing the plurality of status light sources to sequentially execute a first light scheme or a second light scheme in response to instructions to the plurality of dampers.

In another embodiment, a tangible, non-transitory, computer-readable medium, including instructions executable by at least one processor of a control system in a HVAC system that, when executed by the at least one processor, cause the at least one processor to determine whether a plurality of status light sources operate in accordance to a first control signal, determine whether a plurality of communication light sources operate in accordance to a second control signal, sequentially select a zone of a plurality of zones for actuation, such that the selected zone of the plurality of zones includes a corresponding damper of a plurality of dampers, instruct the corresponding damper to open, instruct one or more dampers corresponding to unselected zones of the plurality of zones to close, cause a first status light source corresponding to the corresponding damper to execute a first light scheme in response to instructing the corresponding damper to open, cause a second status light source corresponding to the one or more dampers to execute a second light scheme in response to instructing the one or more dampers to close, and sequentially selecting a subsequent zone of the plurality of zones for actuation after a transition time is reached.

In another embodiment, a method for facilitating status diagnosis of one or more dampers in a HVAC system includes sequentially selecting a damper of one or more dampers for actuation, initially instructing the selected damper to open, initially instructing unselected dampers to close, cause a first status light source corresponding to the selected damper to execute a first light scheme in response to instructing the selected damper to open, cause a second status light source corresponding to the unselected dampers to execute a second light scheme in response to instructing the unselected dampers to close, and sequentially selecting a subsequent damper of the one or more dampers for actuation.

BRIEF DESCRIPTION OF THE DRAWINGS

Various aspects of the present disclosure may be better understood upon reading the following detailed description and upon reference to the drawings, in which:

FIGS. 9A, 9B, 9C are schematic diagrams of the control board of FIG. 6 implementing the Hardware Test Mode of FIG. 7, in accordance with embodiments of the present disclosure;

DETAILED DESCRIPTION

Figure 1:
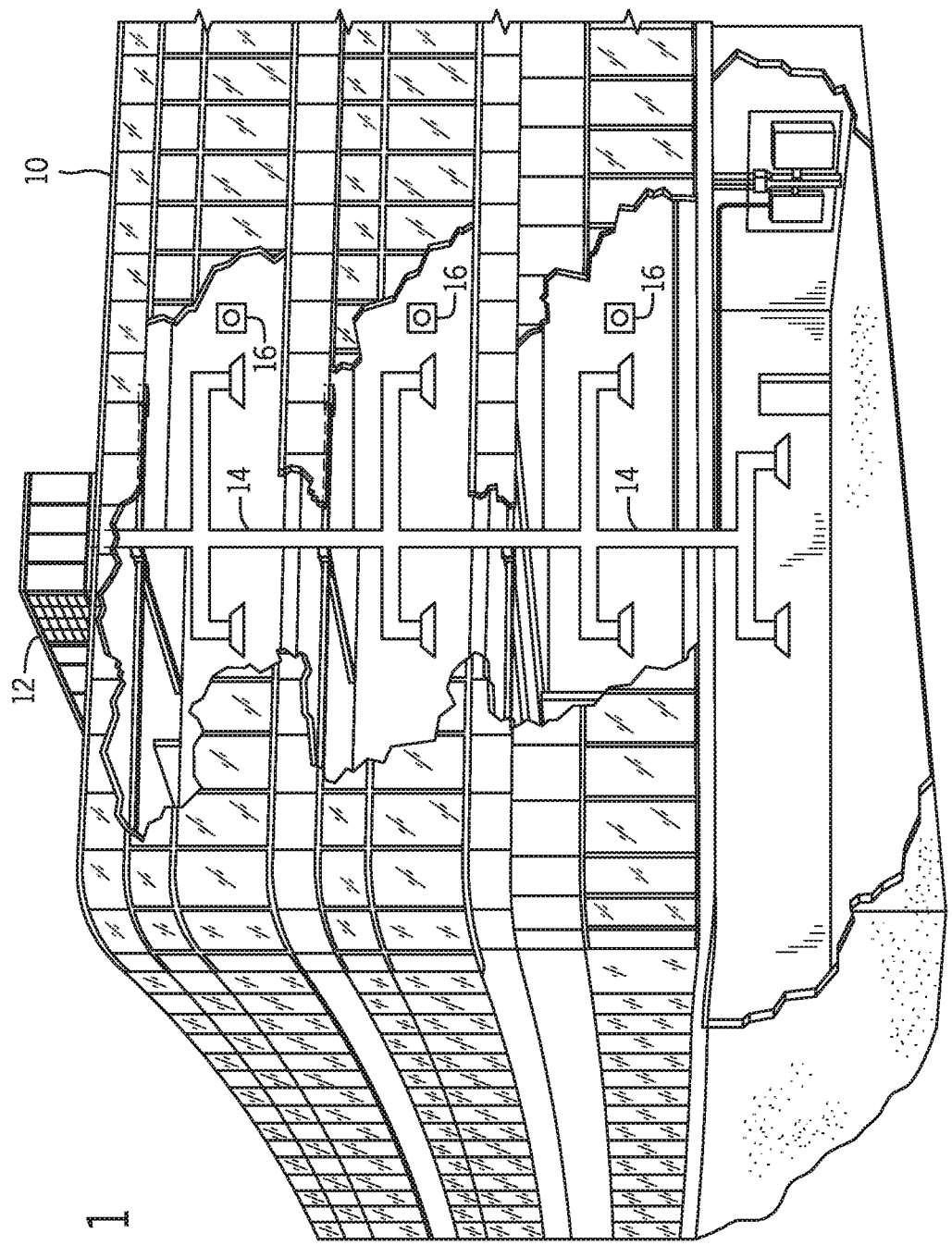
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices or equipment within the HVAC system, for example, implemented via one or more control boards or panels. That is, a control board may receive input data or signals from one or more devices in the HVAC system, such as an interface device, a thermostat, a sensor, another control board, or any combination thereof. Additionally or alternatively, a control board may output control commands or signals that instruct one or more other devices in the HVAC system, such as dampers, to perform control actions. For example, a control board may receive a temperature set point via a thermostat, compare the temperature set point to a temperature measurement received from a sensor, and instruct various dampers in the HVAC system to open when the temperature measurement is below the temperature set point, and may instruct the various dampers to close when the temperature measurement is above the temperature set point. It should be understood that while this discussion focuses on adjusting a configuration of various dampers, the control board may adjust any operation when the temperature measurement deviates from the temperature set point by more than a threshold amount. Indeed, the embodiments disclosed herein may be utilized in conjunction with any controllable devices of the HVAC system.

In some instances, one or more devices in the HVAC system, such as the dampers may operate suboptimally, but the source causing this suboptimal operation may be unknown. The control board may output control commands to instruct the one or more devices in the HVAC system, such as the dampers, to actuate in accordance with a control command. However, the dampers may only partially actuate in accordance with the control command or the dampers may altogether not operate in accordance with the control command. The source of this suboptimal operation may be unknown, and absent the embodiments disclosed herein, the technicians servicing the HVAC system may default to diagnosis the dampers as the source causing the suboptimal operation. However, the actual source causing the suboptimal operation may be external to the dampers. Despite this false diagnosis of the dampers, in some instances, the dampers may still be shipped to a remote service center for servicing, and upon arrival at the remote servicing center, the damper is determined to be adequately operating. In such instances, there may be a loss in revenue, production, and overall efficiency resulting from incorrectly diagnosing the dampers and having the dampers transported to the remote service center for servicing when no servicing is required.

With this in mind, the embodiments disclosed herein include systems and methods for facilitating and improving the diagnosis of dampers operating in the HVAC system by executing a "Hardware Test Mode," as described in detail below. As used herein, the Hardware Test Mode may include executing logic via the control board to enable the dampers to actuate in accordance with control commands, enabling visual indications presented by light-emitting diode lights (LEDs) corresponding to the actuatable dampers, and displaying unique troubleshooting information on a display. While the embodiments disclosed herein include light sources discussed in the context of LEDs, such discussion is meant to facilitate an application, but it should be understood that the embodiments disclosed herein may be realized with compact fluorescent (CFL) light sources, halogen light sources, fluorescent light sources, high intensity discharge (HID) light sources, projector devices, and/or any suitable light emitting device.

In some instances, the logic associated with the Hardware Test Mode may cause the control board 48 to instruct status LEDs to flash to indicate that status LEDs are in communication with their corresponding damper and properly functioning, and instruct communication LEDs to flash to indicate that the communication LEDs are in communication with their corresponding thermostat and properly functioning. When the status LEDs and the communication LEDs flash in accordance to the command instructions, the status and communication LEDs may serve as an indication to the technician that the damper LEDs are properly functioning and in communication with their corresponding dampers.

In some embodiments, logic associated with the Hardware Test Mode also causes the control board to instruct a first damper to open and the corresponding status LED to execute a first light pattern, such that executing the first light pattern signals to the technician that the first damper is open or opening. While the first damper and the corresponding status LED behave accordingly, the control board may also instruct the other dampers to close and their corresponding LEDs to execute a second light pattern, such that the second light pattern signals to the technician that the corresponding damper is closed or is closing. After a certain period of time, the control board may instruct the first damper to close and the corresponding status LED to execute the second light pattern to indicate that the first damper is closing. In addition, the control board may instruct the second damper to open and the corresponding status LED to execute the first light pattern. This process is repeated for each of the dampers in the HVAC system. As such and as discussed in detail below when the status and communication LEDs are determined to be properly function, when the status LEDs flash in accordance with the logic, but the corresponding damper does not operate in accordance with the logic, the source of the suboptimal operation may be the damper because power and command instructions are being received by the corresponding status LED, but not the damper. This may enable a technician to test voltages of actuatable components, such as relays, opening and closing the corresponding to damper during execution of the first and second light pattern to diagnose the dampers before sending the dampers to remote servicing centers. As such, the embodiments disclosed herein may be helpful in diagnosing components of HVAC systems.

With the foregoing in mind, the embodiments disclosed herein provide systems and methods to enable a technician to initiate the Hardware Test Mode to visually inspect LEDs, measure voltage outputs of relays that open and/or close the dampers, examine a visual displayed by the control board, or any combination thereof, to more efficiently diagnose the dampers. By more efficiently diagnosing the operation of the dampers, time and resource expenditures associated with servicing the dampers identified to need servicing may be reduced because the Hardware Test Mode may enable the technician to more easily determine the source causing the suboptimal damper operation.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supplied the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
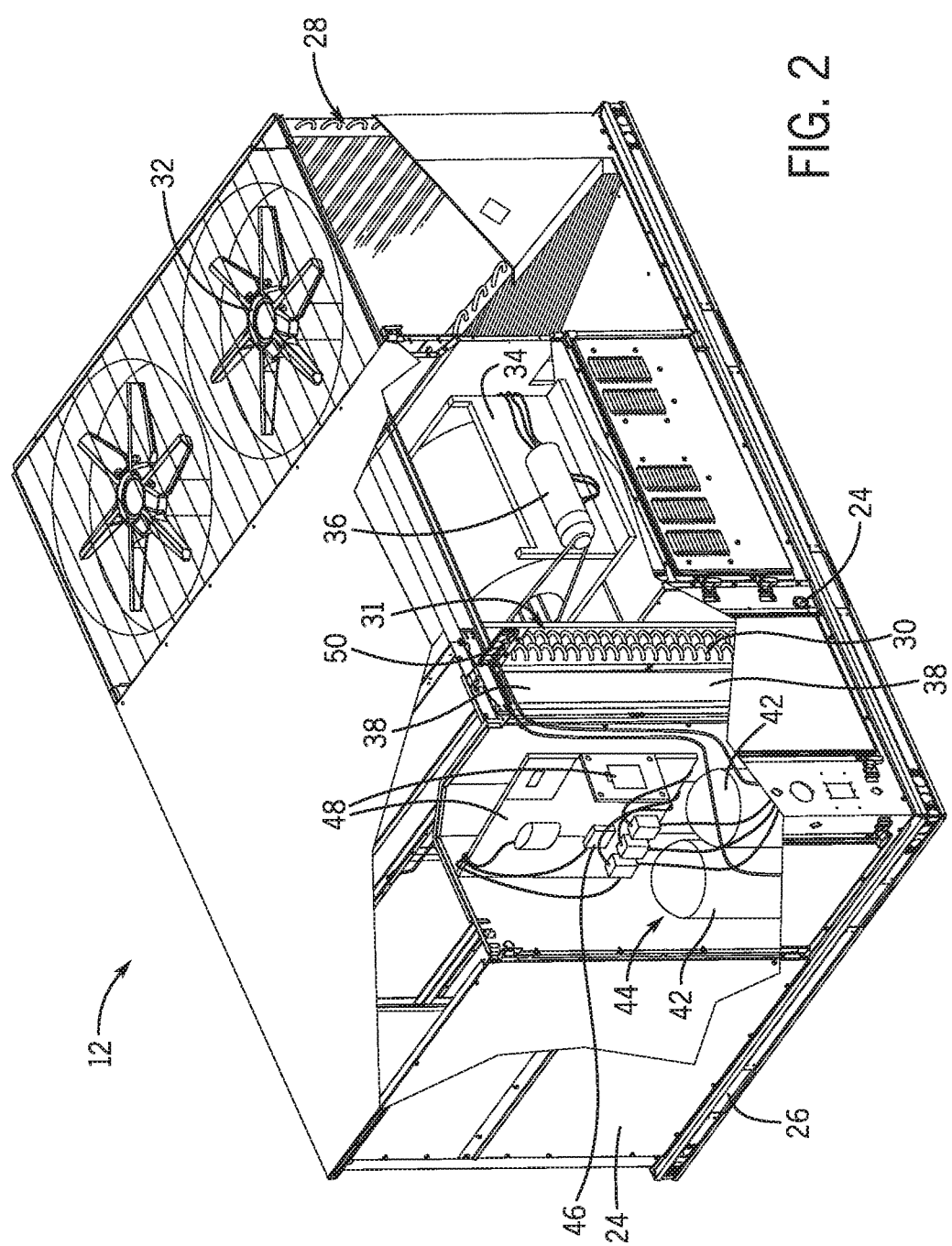
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 50 may connect the control board 48 and the terminal block 46 to the equipment of the HVAC unit 12.

Figure 3:
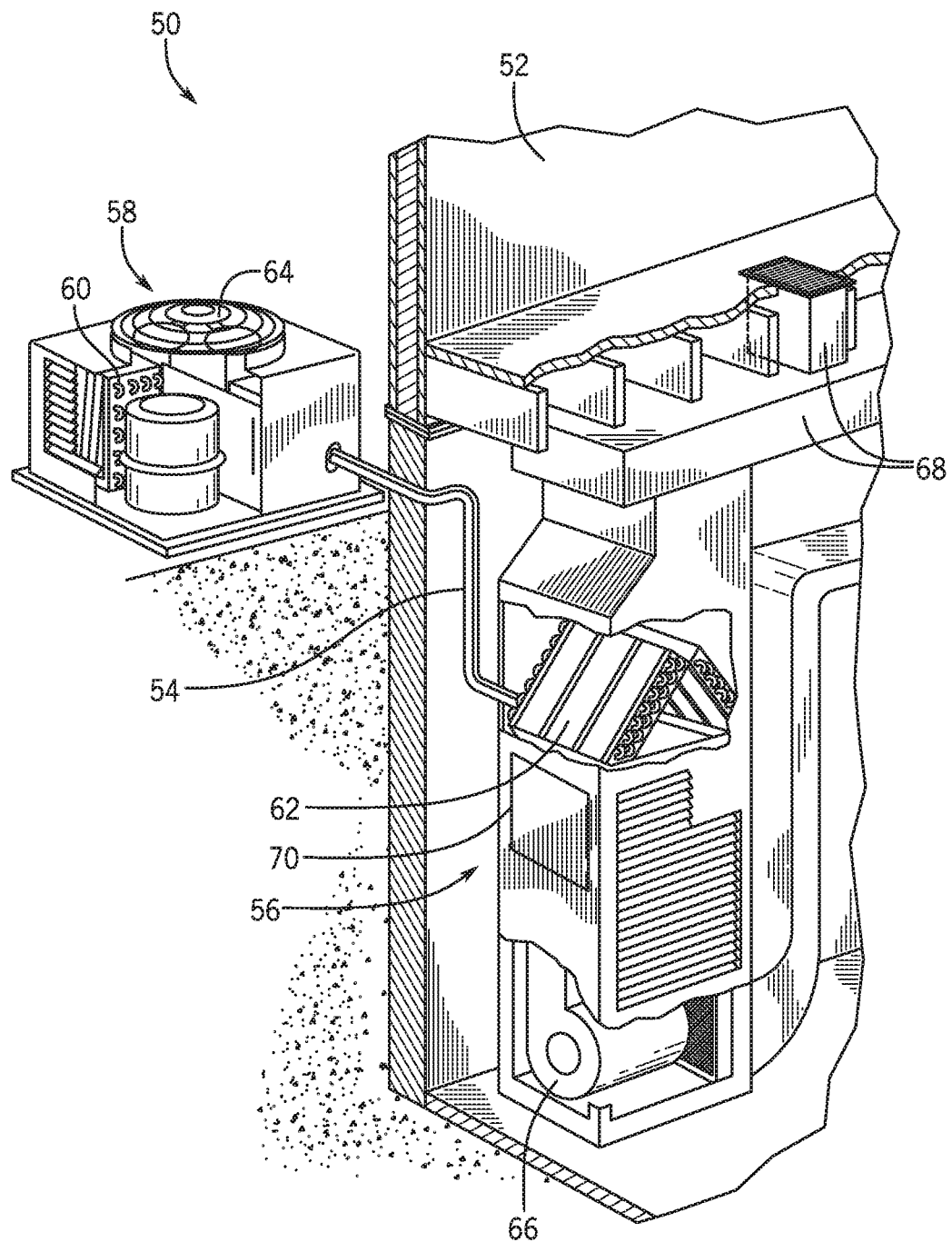
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
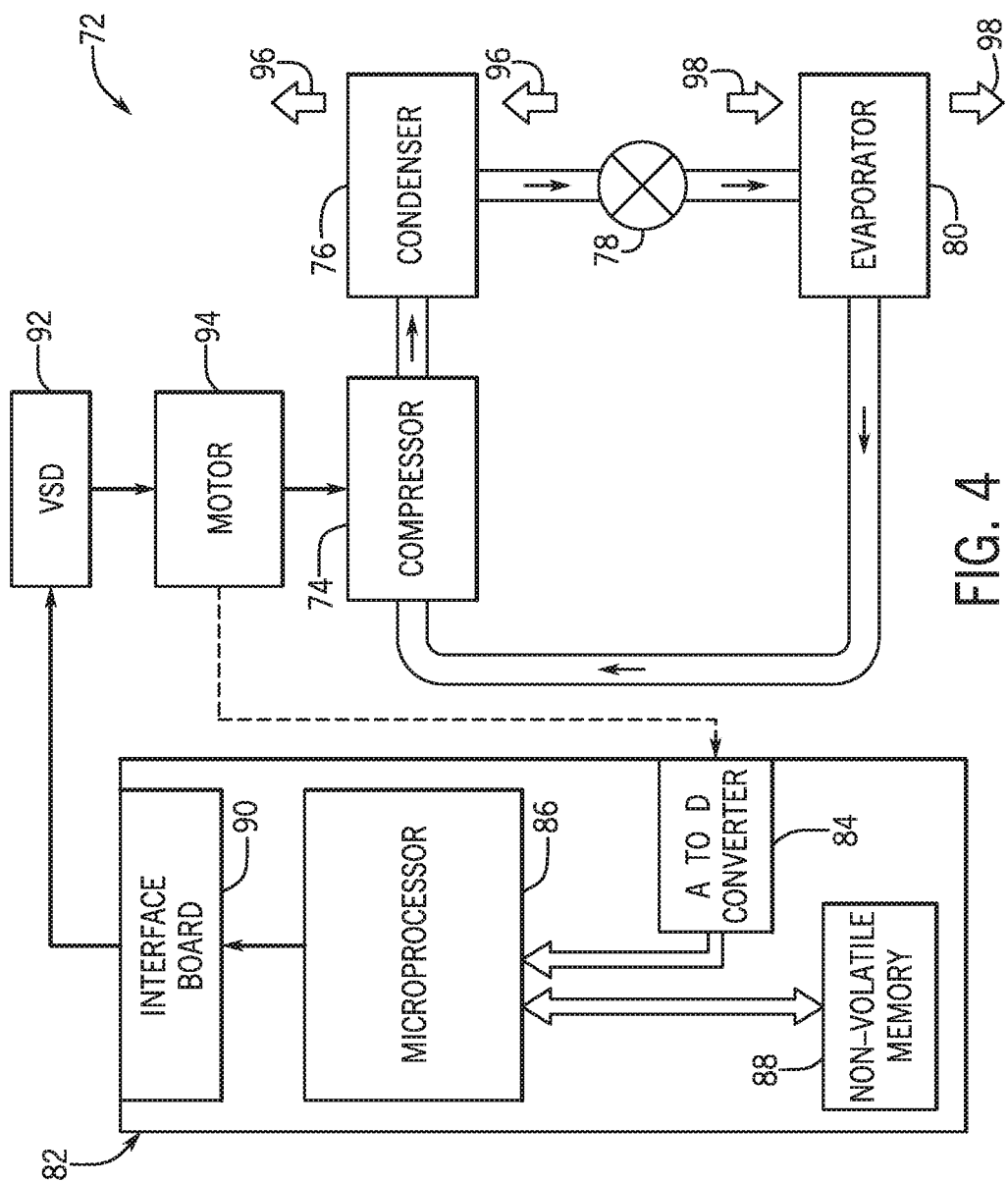
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in more detail below, multiple control boards 48, such as control panels 82, may be implemented in the HVAC system, for example, to facilitate improving control granularity and/or to provide hierarchical control.

Figure 5:
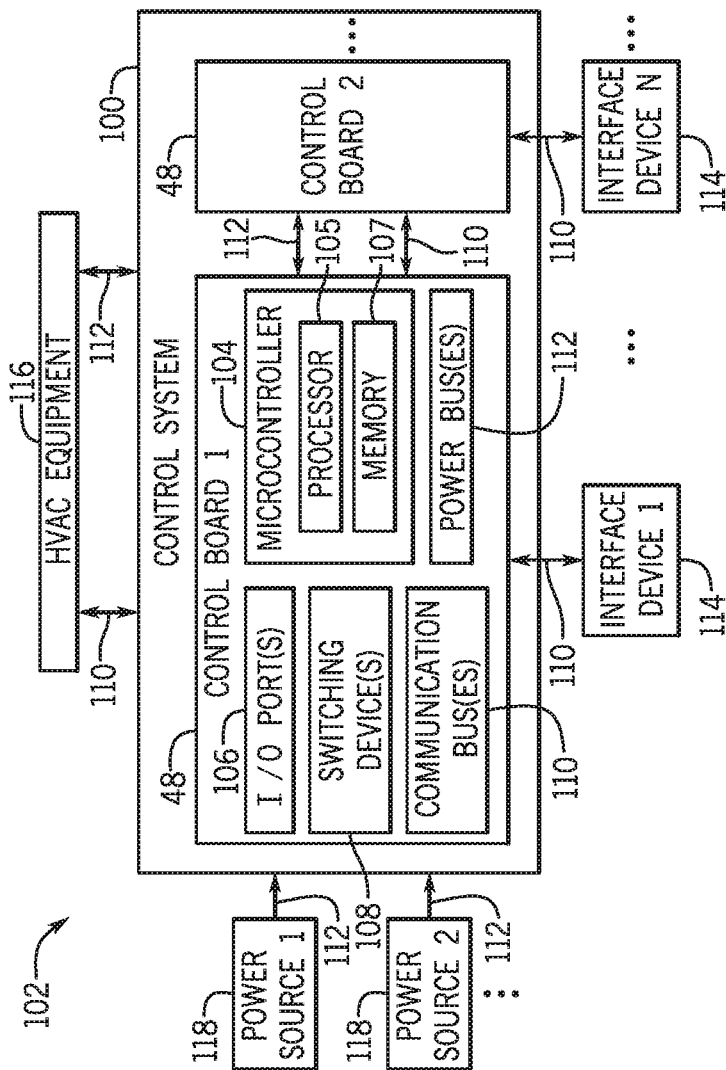
FIG. 5 is a block diagram of a portion of the HVAC system of FIG. 1 including a control system implemented using one or more control boards, in accordance with an embodiment of the present disclosure.

To help illustrate, a control system 100 that includes multiple control boards 48, which may be used to facilitate controlling operation of equipment in an HVAC system 102, is shown in FIG. 5. Each control board 48 may include a microcontroller 104 and one or more input/output (I/O) ports 106, switching devices 108, such as relays, communication buses 110, and power buses 112. The microcontroller 104 may include a processor 105, such as microprocessor 86, and memory 107, such as non-volatile memory 88, to facilitate controlling operation of the HVAC system 102.

For example, the microcontroller 104 may communicate control commands instructing the HVAC equipment 116, such as a VSD 92, to perform a control action, such as adjust speed of motor. In some embodiments, the microcontroller 104 may determine control commands based on user inputs received from an interface device 114 and/or operational parameters, such as speed, temperature, and/or pressure, indicated by the HVAC equipment 116, such as a thermostat sensor. Further, as described above, the HVAC equipment 116 and the interface devices 114 may each communicate using a communication protocol that may, for example, govern a data transmission rate and/or checksum data of transmitted data.

To facilitate controlling operation of the HVAC system 102, a control board 48 may include one or more I/O ports 106 that may enable the control board 48 to communicatively couple to an interface device 114, another control board 48, and/or HVAC equipment 116 via an external communication bus 110. In some embodiments, an external communication bus 110 may include one or more off-board connections, such as wires and/or cables. Additionally, the I/O ports 106 may communicatively couple to the microcontroller 104 via internal or on-board communication buses 110. In some embodiments, an internal communication bus 110 may include one or more on-board connections, such as PCB traces. In this manner, the communication buses 110 may enable the control board 48 to control operation of a device, such as an interface device 114, another control board 48, and/or HVAC equipment 116.

In some embodiments, the device may operate using electrical power. Thus, to facilitate controlling operation of a device, one or more of the I/O ports 106 on the control board 48 may also facilitate conducting electrical power (e.g., 24 VAC) from power sources 118 to the device via power busses 112. For example, the control board 48 may receive electrical power from a power source 118, such as a transformer (e.g., an indoor transformer and/or an outdoor transformer), and/or another control board 48 via external power buses 112 coupled to an I/O port 106. Additionally or alternatively, the control board 48 may receive electrical power from a power source 118 and/or another control board 48 via external power buses 112 coupled to a power source input. In some embodiments, an external power bus 112 may include one or more off-board connections. Additionally, the control board 48 may output electrical power to HVAC equipment 116 and/or another control board 48 via additional external power buses 112 coupled to its I/O ports 106. The control board 48 may also route electrical power between its I/O ports 106 and/or between its I/O ports 106 and the power source input via internal power buses 112. In some embodiments, an internal power bus 112 may include one or more on-board connections. For example, the power source 118 may supply power to HVAC equipment, such as dampers.

Each of the power sources 118 and/or control boards 48 coupled to a power source input may provide electrical power with certain power parameters, such as voltage, current, phase, and/or the like. Accordingly, in some embodiments, a first power source 118, such as an indoor transformer, may provide 24 VAC electrical power with zero phase-offset, and a second power source 118, such as an outdoor transformer, may provide 24 VAC with a 90 degree phase-offset. Further, in some embodiments, the first power source 118 may provide 24 VAC electrical power with zero phase-offset, and the second power source 118 may provide 24 VAC electrical power with 90 degree phase-offset. As such, the control board 48 may receive electrical power having respective power parameters from a number of power sources 118 and/or control boards 48.

Further, as the control board 48 may simultaneously receive electrical power from multiple different power sources 118 and/or additional control boards 48, the control board 48 may use the switching device 108 (e.g., latching device) to electrically isolate the electrical powers supplied by different power sources 118, for example, to facilitate improving communication quality. In particular, when electrical power output from two power sources 118 is out of phase relative to one another, routing the electrical powers through the control board 48 in close proximity or within the same internal busses 112 may result in cross talk and/or phantom voltages. That is, for example, in cases where electrical power of a first power source 118 has a first phase as a power parameter and electrical power of a second power source 118 has a second phase that is different from the first phase as a power parameter, the electrical powers may create undesired effects in certain regions of the control board 48 and/or induce voltages in wires and/or components, which may result in unpredictable behavior in the control board 48 and/or in a device coupled to the control board 48. Accordingly, the switching device 108 may switch between the power buses 112 coupled to the power sources 118 to isolate the electrical powers received from each power source 118 and reduce, thereby reducing likelihood of producing undesired effects (e.g., cross talk, phantom voltages, and/or the like) that may result from competing electrical powers (e.g., electrical powers from different power sources 118) that are not electrically isolated.

By supporting multiple control boards 48, the responsibilities of the control system 100 may be segregated. That is, a first control board 48 may handle certain responsibilities, such as communicating with a first interface device 114 and HVAC equipment 116 corresponding with a first building zone, while a second control board 48 may handle other responsibilities, such as communicating with a second interface device 114 and HVAC equipment 116 corresponding with a second building zone. In some embodiments, the first control board 48 may handle responsibilities such as communicating with and controlling HVAC equipment 116 corresponding with a set of building zones, such as a first, second, third, and fourth zone. The second control board may handle responsibilities such as communicating with and controlling HVAC equipment 116 corresponding with another set of building zones, such as a fifth, sixth, seventh, and eighth zone. As such, the control system 100 may improve control granularity, as each control board 48 may handle a dedicated subset of responsibilities instead of all of the responsibilities of the control system 100. Further, the control boards 48 may communicatively couple to one another so that relevant information regarding related responsibilities and/or tasks may be shared. In some embodiments, for example, the first control board 48 may receive and process a request, such as a temperature setpoint, from the interface device 114, such as a thermostat, and the second control board 48 may use information processed by the first control board 48 to control the HVAC equipment 116, such as VSD 92. As such, each control board 48 may be implemented to handle a different set of responsibilities and to communicate with other control boards 48, as will be described in further detail.

Further, in some embodiments, the control boards 48 may be coupled to facilitate implemented a control hierarchy. For example, a first control board 48 may operate as a master to a subordinate control board 48. In some embodiments, the master control board 48 may handle coordination with and between subordinate control boards 48. The subordinate control board 48 may receive instruction from the master control board 48 and control a set of devices accordingly. Further, in some embodiments, the master control board 48 may handle a subset of responsibilities, the subordinate control board 48 may handle a different subset of responsibilities, and each control board 48 may dynamically change between operating as a master control board 48 or a subordinate control board 48.

Figure 6:
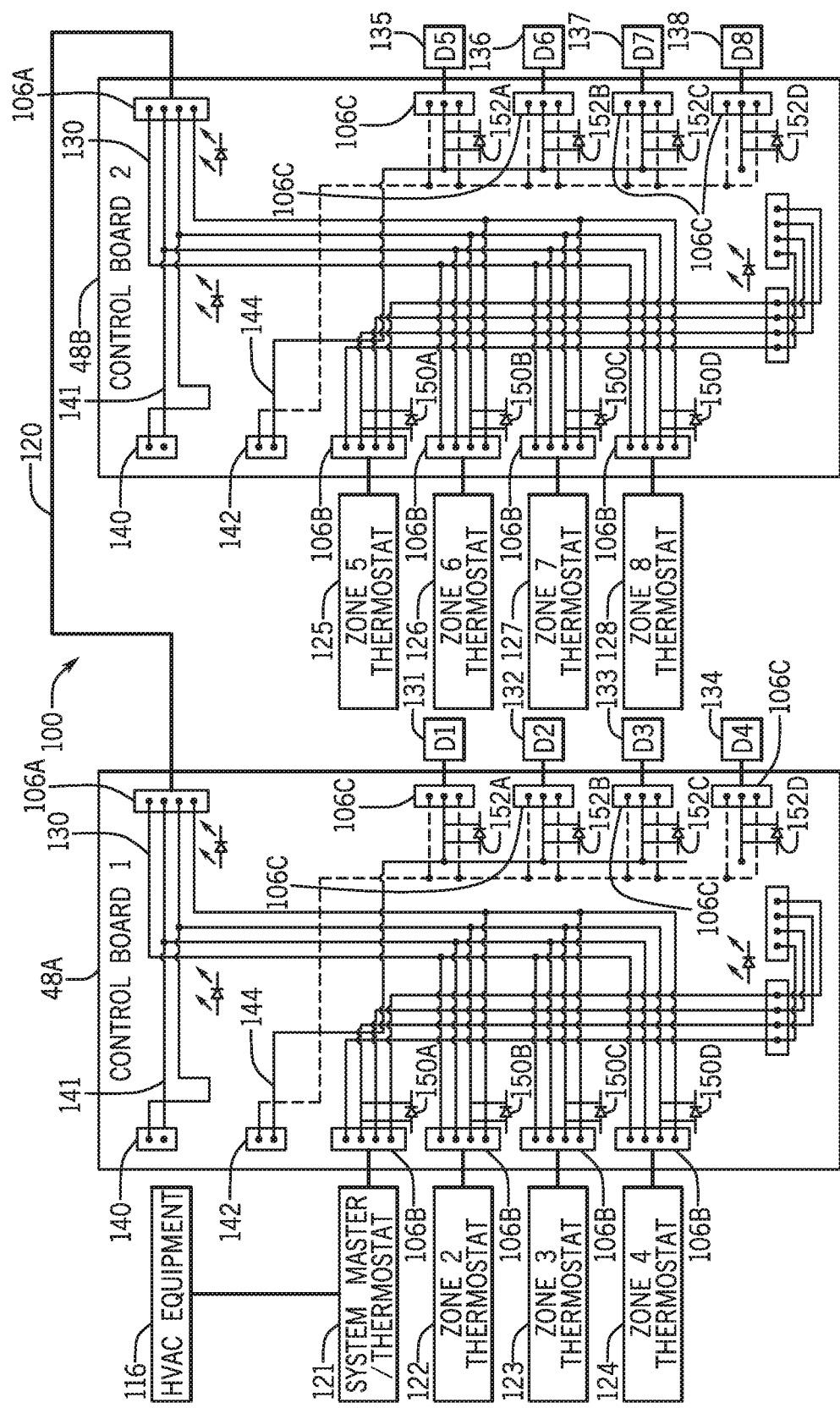
FIG. 6 is a schematic diagram of example control boards implemented in the control system of FIG. 5, in accordance with an embodiment of the present disclosure.

To help illustrate, an example of control boards 48, which may be implemented in a control system 100 for purposes of facilitating the diagnosis of components of the HVAC system 102, is shown in FIG. 6. In the illustrated embodiment, a first control board 48A and a second control board 48B, collectively referred to as "control boards 48," communicatively coupled via respective first I/O ports 106. In the illustrated embodiment, the respective first I/O ports 106 are communicatively coupled via a first connection 120. As used herein, "connection" may refer to any hardware component linking two components for the purposes of communication, data exchange, and/or the transfer of power. It should be understood that a connection may be realized by any number of features, such as a signal traces, communications buses, switching devices 108, such as relays, and the like, operating in accordance with certain parameters, such as a communication protocols, power phase shifts, and the like. With the following in mind, the first connection 120 enables the communication of information between the first and second control board 48A and 48B. In this manner, the inputs into the first control board 48A may also be used in determining the outputs of the second control board 48B, and the inputs into the second control board 48B may also be used in determining the outputs of the first control board 48A. In some embodiments, the first connection 120 also enables the transfer of power between the components each control board 48 is responsible for.

In the illustrated embodiment, the control boards 48 are each respectively coupled to four HVAC equipment components 116. Specifically, in the illustrated embodiment, the first control board 48A is communicatively coupled to a first zone thermostat 121, a second zone thermostat 122, a third zone thermostat 123, and a fourth zone thermostat 124, while the second control board 48B is communicatively coupled to a fifth zone thermostat 125, a sixth zone thermostat 126, a seventh zone thermostat 127, and an eighth thermostat 128. The first and second control boards 48A, 48B may each receive signals indicative of operating parameters, such as temperature set points, from the corresponding thermostats. While in the illustrated embodiment, the first zone thermostat 121 is the system master thermostat that communicates operating parameters indicative of the entire HVAC system 102 to the control system 100, any of the illustrated zone thermostats may be the system master thermostat. Furthermore, the embodiments disclosed herein are no limited to control boards communicatively coupled to four zone thermostats. Indeed, the control boards 48 may be communicatively coupled to any suitable number of HVAC equipment components 116, such as zone thermostats.

The zone thermostats may be connected to their respective control board 48 via respective second I/O ports 106B. The second I/O ports 106B may be communicatively coupled to the first I/O ports 106A via a second connection 129. In some embodiments, the second connection 129 enables the zone thermostats to exchange information indicative of the respective operating parameters between the first and second control boards 48A, 48B. To facilitate illustration and discussion, the one or more processors 105 (FIG. 5) of the control boards 48 have been omitted from the embodiment of FIG. 6, by it should be understood that the second connection 129 may enable the zone thermostats to communicatively couple to the one or more processors (FIG. 5) of the control boards 48.

In some embodiments, each building zone may be associated with a corresponding damper 130. For example, in the illustrated embodiment, a first building zone, including the first zone thermostat 121, may be associated with a first damper 131, a second building zone, including the second zone thermostat 122, may be associated with a second damper 132, a third building zone, including the third zone thermostat 123, may be associated with a third damper 133, a fourth building zone, including the fourth zone thermostat 124, may be associated with a fourth damper 134, a fifth building zone, including the fifth zone thermostat 125, may be associated with a fifth damper 135, a sixth building zone, including the sixth zone thermostat 126, may be associated with a sixth damper 136, a seventh building zone, including the seventh zone thermostat 127, may be associated with a seventh damper 137, and an eighth building zone, including the eighth zone thermostat 128, may be associated with an eighth damper 138. These dampers may be collectively referred herein as "dampers 130." The control boards 48 may output control commands to the dampers 130 via a third I/O port 106C associated with each damper 130.

In the illustrated embodiment, the control boards 48 may output control commands to the dampers 130 based at least on the determined operating parameters, for example, determined by the zone thermostats communicatively coupled to the control board 48. For example, the second zone thermostat 122 may determine that the temperature second zone deviates from the desired temperature set point, which may cause the first control board 48A to execute logic and instruct the second damper 132 to open to change the temperature in the second zone to more closely match the desired temperature set point.

In the illustrated embodiment, the control boards 48 also include a fourth I/O port 140 that may enable the control boards 48 to interface with a power source 118 (FIG. 5) to supply electric power to the thermostats directly coupled to the control boards 48. The power may be supplied via a third connection 141. In this manner, the fourth I/O port 140 enables a power source 118 to couple with the first control board 48A to supply power to the first, second, third and fourth zone thermostats 121, 122, 123, 124. In a similar manner, the fourth I/O port 140 enables the power source 118 to couple with the second control board 48B to supply power to the fifth, sixth, seventh, and eighth zone thermostats 125, 126, 127, 128.

In addition, the control boards 48 may each include a fifth I/O port 142 that enables another power source 118 to couple with the control boards 48A, 48B to supply electric power to the thermostats directly coupled to the control boards 48A, 48B. The power may be supplied via a fourth connection 144. In this manner, the fifth I/O port 142 enables the power source 118 to couple with the first control board 48A to supply power to the first, second, third and fourth dampers 131, 132, 133, 134. In a similar manner, the fifth I/O port 142 enables the power source 118 to couple with the second control board 48B to supply power to the fifth, sixth, seventh, and eighth dampers 135, 136, 137, 138.

In the illustrated embodiment, the control boards 48 include communication LEDs 150 for each zone thermostat communicatively coupled to the control boards 48. In some embodiments, the communication LEDs 150 may be connected in parallel to the third connection 141 downstream the corresponding second I/O port 106B. In the illustrated embodiment, each zone thermostat is associated with a corresponding communication LED 150. The communication LEDs 150 may each be communicatively coupled to the one or more processors 105 of the control boards 48A, 48B. For example, a first communication LED 150A corresponding to the first zone thermostat 121 may be connected downstream the second I/O port 106B after the first zone thermostat 121 interfaces with the first control board 48A via the second I/O port 106B. Similarly, a second communication LED 150B may be communicatively coupled to the second thermostat 122, a third communication LED 150C may be communicatively coupled to the third thermostat 123, and a fourth communication LED 150D may be communicatively coupled to the fourth thermostat 124. In this manner, the communication LED 150 may execute certain light patterns in response to receiving the electrical power used to power the corresponding zone thermostat, as discussed in detail below.

Additionally, in the illustrated embodiment, the control boards 48 include status LEDs 152 for each damper 130 communicatively coupled to the control boards 48. In some embodiments, the status LEDs 152 may be connected in parallel to the fourth connection 144 upstream the corresponding third I/O port 106C. In the illustrated embodiment, each damper 130 is associated with a corresponding status LED 152. The status LEDs 152 may also be communicatively coupled to the one or more processors 105 of the control boards 48. For example, a first status LED 152A corresponding to the first damper 131 may be connected upstream the third I/O port 106C before the first damper 131 interfaces with the first control board 48A via the third I/O port 106C. Similarly, a second status LED 152B may be communicatively coupled to the second damper 132, a third status LED 152C may be communicatively coupled to the third damper 133, and a fourth status LED 152D may be communicatively coupled to the fourth damper 134. In this manner, the status LEDs 152 may execute certain light patterns in response to receiving the electrical power and/or control commands used to open or close the corresponding damper 130, as discussed in detail below.

Figure 7:
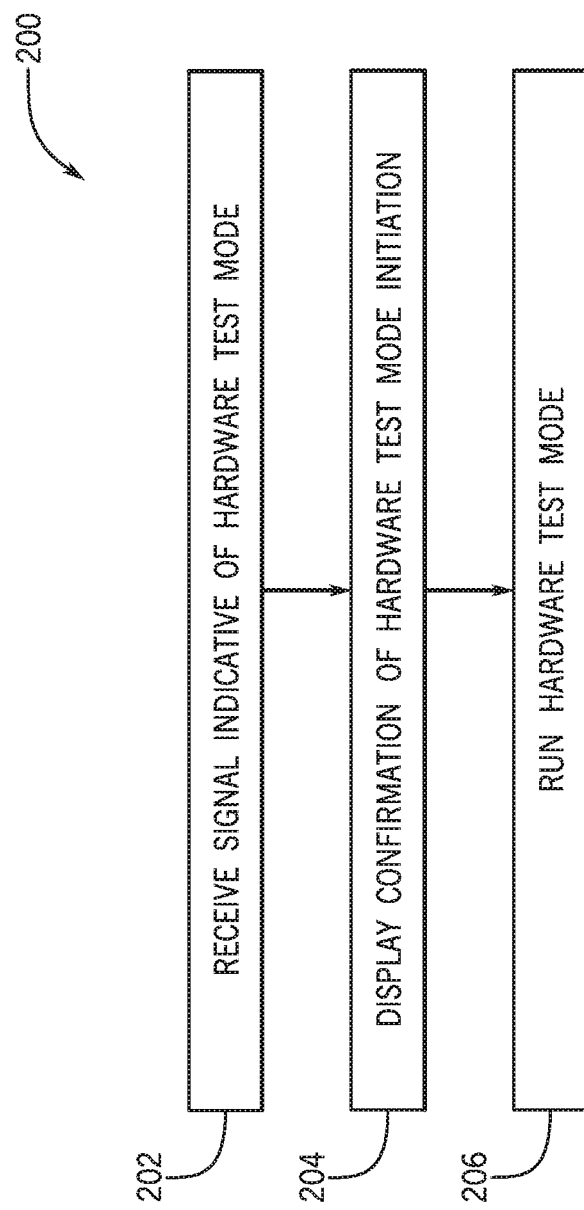
FIG. 7 is a flow diagram of a process for implementing a Hardware Test Mode via the control board of FIG. 6, in accordance with an embodiment of the present disclosure.
Figure 8:
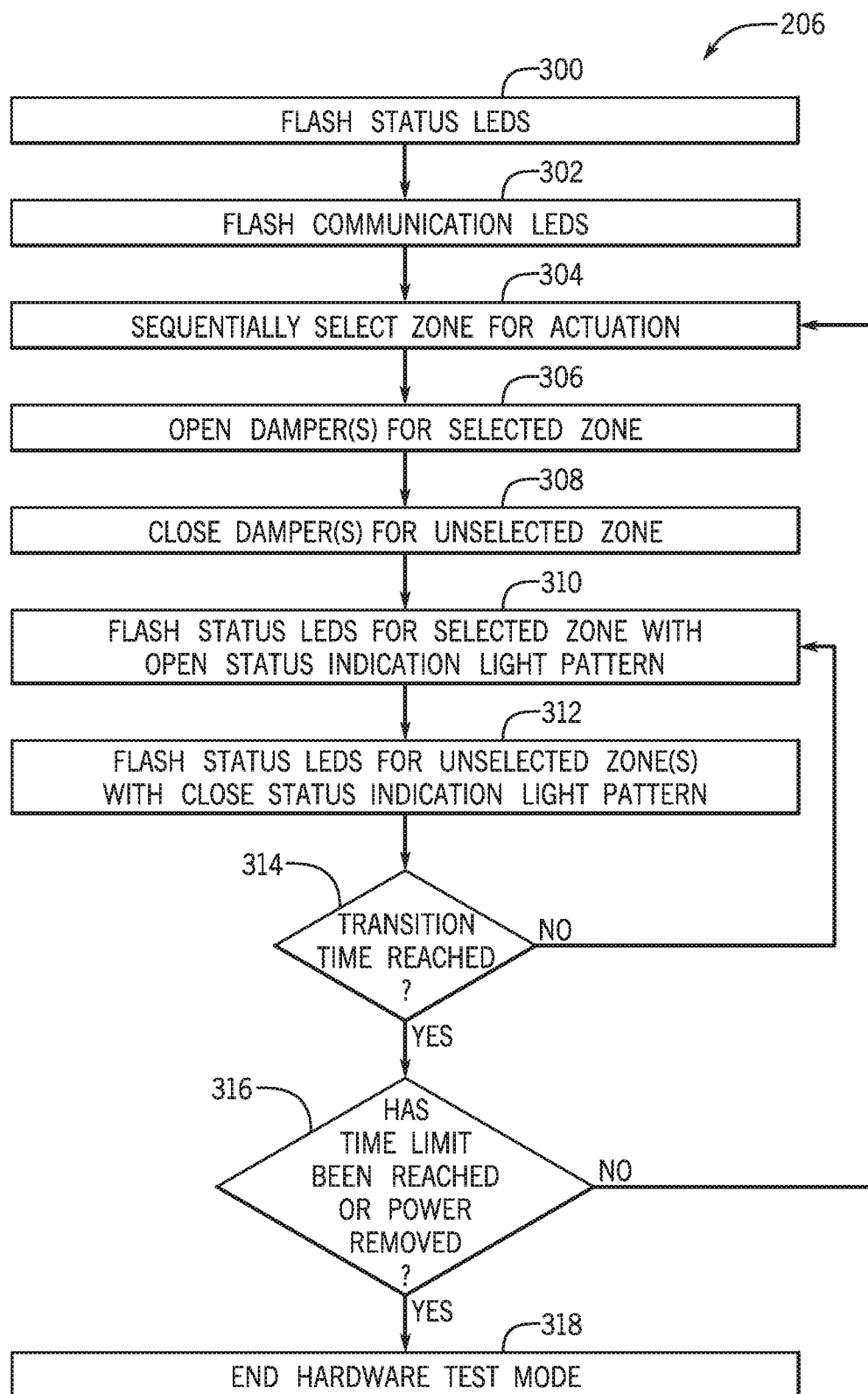
FIG. 8 is a flow diagram of a process for executing the Hardware Test Mode of FIG. 7, in accordance with an embodiment of the present disclosure.
Figure 9C:
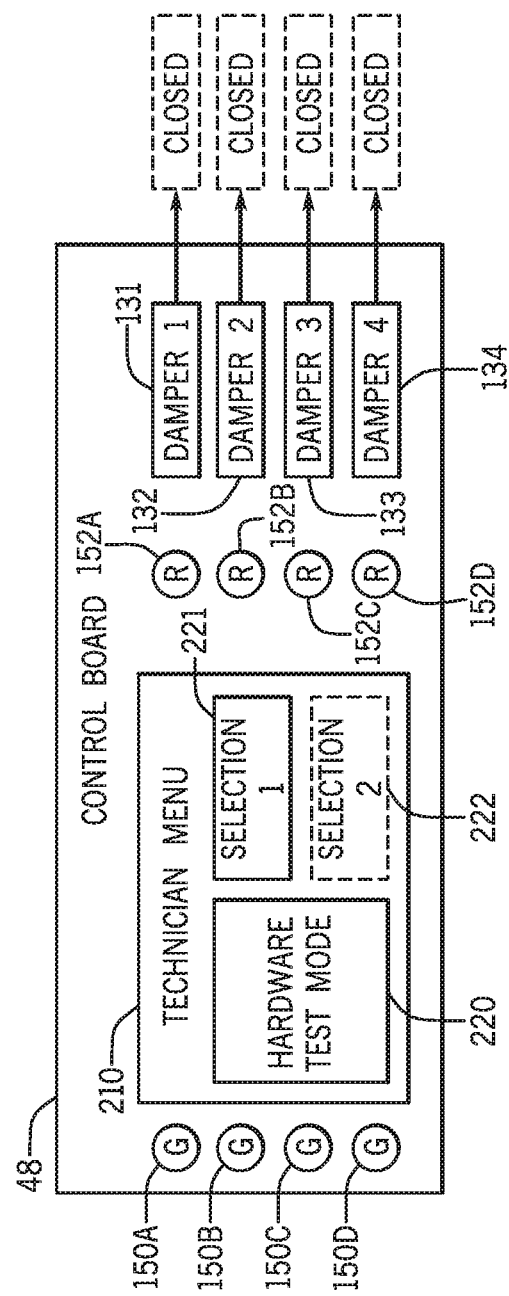
Figure 10A:
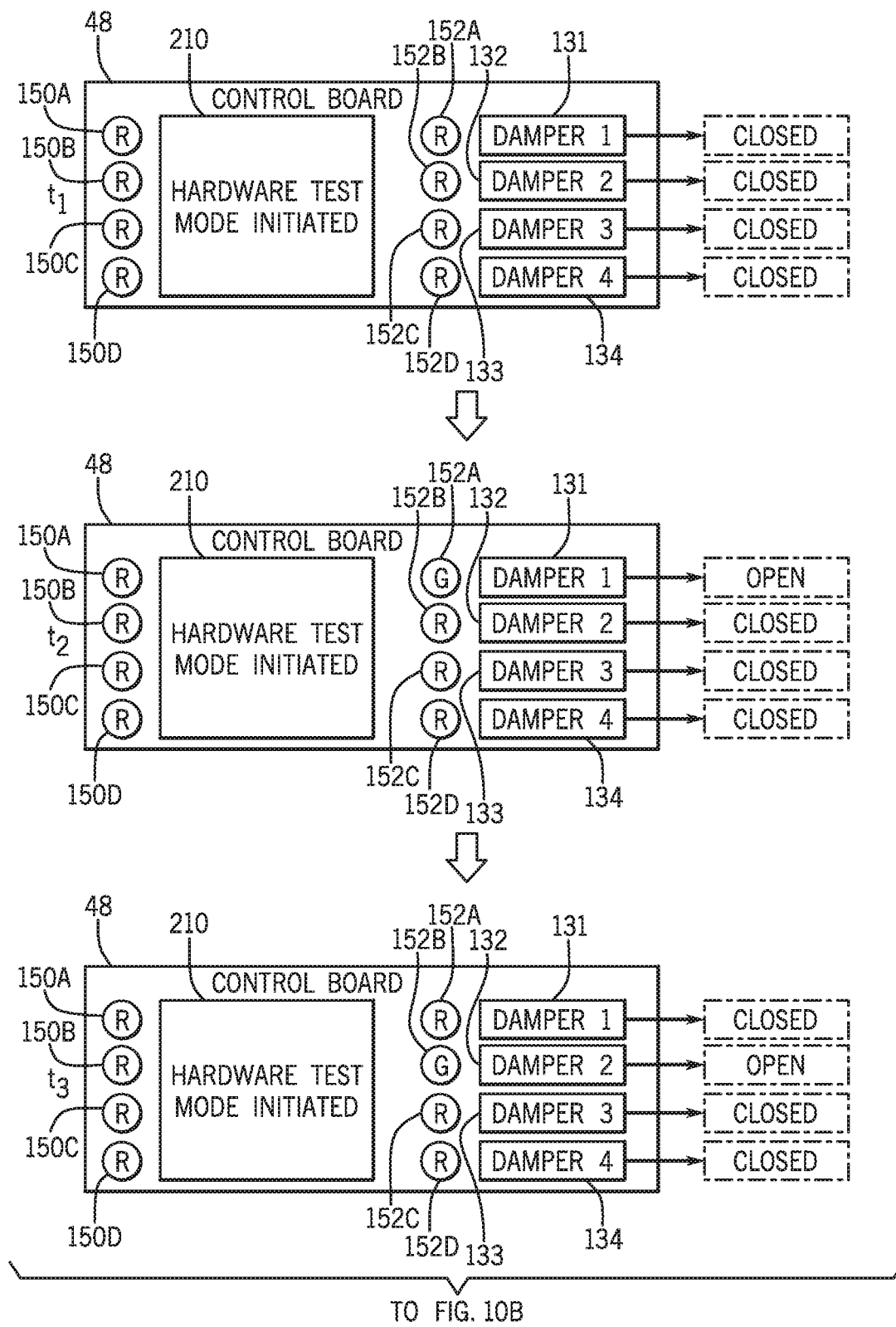
FIGS. 10A, 10B are schematic diagrams of the control board of FIG. 6 executing the Hardware Test Mode of FIG. 7, in accordance with an embodiment of the present disclosure.
Figure 10B:
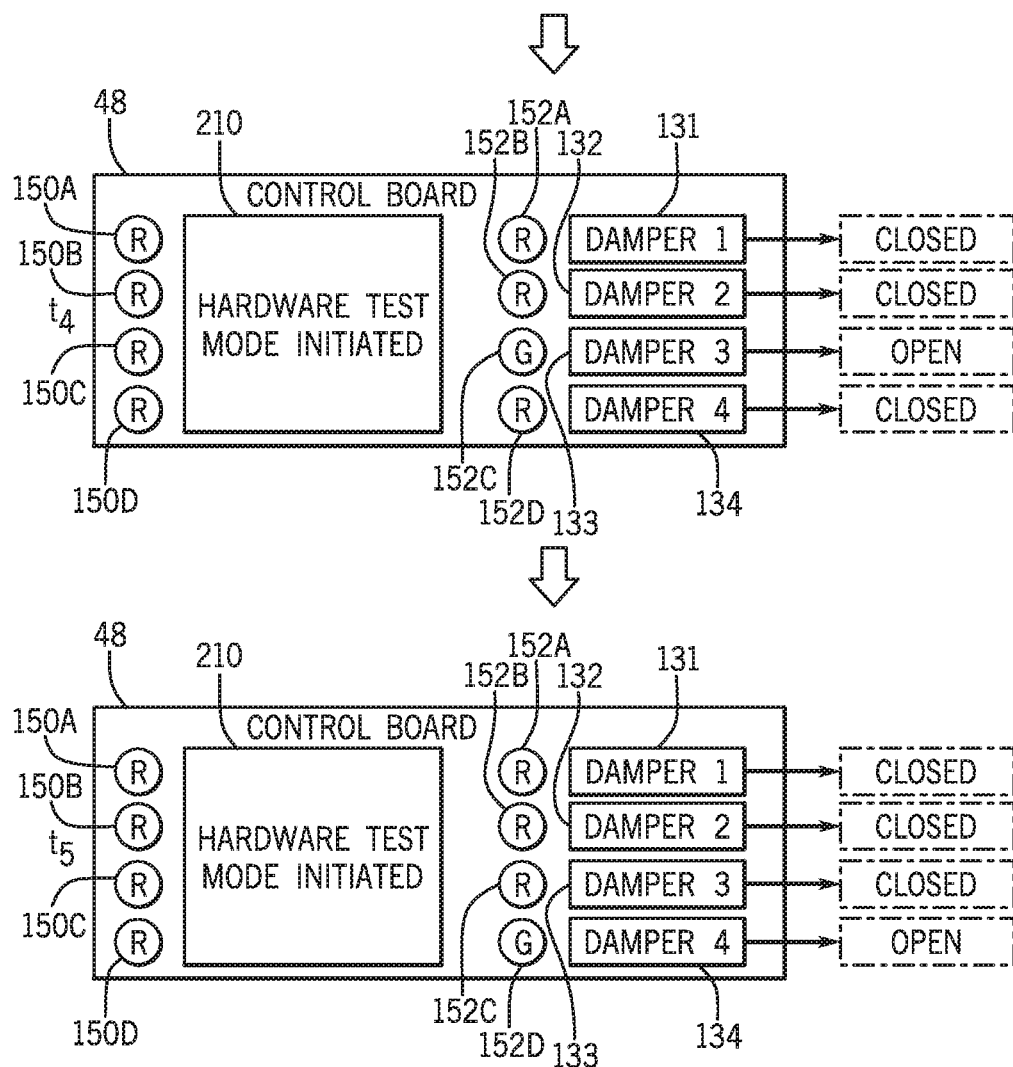

FIGS. 7-8 illustrate a respective flow diagram of a process 200, 206 associated with a Hardware Test Mode, in accordance with embodiments of the present disclosure. In particular, FIG. 7 is a flow diagram of a process 200 for implementing a Hardware Test Mode via the control board 48 of FIG. 6, and FIG. 8 is a flow diagram of a process 206 for executing the Hardware Test Mode of FIG. 7, in accordance with embodiments of the present disclosure. To facilitate discussion, the processes discussed in the flow diagrams of FIGS. 7-8 are discussed in conjunction with the schematic diagrams of FIGS. 9-11. Specifically, FIG. 9 is a schematic diagram of the control board of FIG. 6 implementing the Hardware Test Mode of FIG. 7, FIG. 10 is a schematic diagram of the control board of FIG. 6 executing the Hardware Test Mode of FIG. 7, and FIG. 10 is a schematic diagram of the Hardware Test Mode of FIG. 7 executed on a plurality of the control boards of FIG. 6, in accordance with embodiments of the present disclosure.

Generally, the process 200 of FIG. 7 may be performed by the control board 48 and may include receiving (process block 202) a signal indicative of a Hardware Test Mode. The control board 48 may include a display that presents (process block 204) a conformation that the Hardware Test Mode has been initiated. After presenting the confirmation or in conjunction with presenting the confirmation, the control board may run (process block 206) the Hardware Test Mode, as discussed in detail with regard to FIG. 8.

To help illustrate the process 200 of FIG. 7, FIGS. 9A-9C include a respective schematic diagram of the control board 48 of FIG. 6 implementing the Hardware Test Mode of FIG. 7. In the illustrated embodiments of FIGS. 9A-9C, the control board 48 includes a technician menu 210 which may include various selectable features. In some embodiments, the technician menu 210 may be realized via a display associated with the control board 48, as discussed above. In the illustrated embodiment, the technician menu 210 includes a Hardware Test Mode selectable feature 220, a first selectable feature 221, and a second selectable feature 222. These selectable features may include buttons, knobs, haptic sensors, or any suitable devices, that when selected causes the control board 48 to receive (process block 202) a signal indicative of the selection. That is, the technician menu 210 may include selectable features that enable a technician to initiate the Hardware Test Mode. For example, upon selection of the Hardware Test Mode selectable feature 220, the control board 48 may receive (process block 202) a signal indicative of this Hardware Test Mode. In response to receipt of selection of the Hardware Test Mode, the control board 48 may display (process block 204) confirmation of the initiation of the Hardware Test Mode. For example, the control board 48 may present "Hardware Test—Active." After presenting this confirmation, the control board 48 may run (process block 206) the Hardware Test Mode, as discussed in detail below.

In the illustrated embodiment, the control board 48 includes a communication LED 150 and a status LED 152 corresponding to each damper 130. While text indicators indicating that the dampers 130 are "closed" or "open" may not be a feature of the control board 48, these text indicators are illustrated to indicate the status of the dampers 130, for example, whether the dampers 130 are "open" or "closed." However, in some embodiments, the text indicators may be presented by the display of the control board 48. In this embodiment, the first, second, third, and fourth damper 131, 132, 133, 134 are associated with the control board 48. In addition, the Hardware Test Mode has not yet been initiated in the embodiment of FIG. 9A. To further illustrate that the Hardware Test Mode has not yet been initiated, in the illustrated embodiment, all the dampers 130 are labeled as "closed" and the corresponding communication LED 150 are red to indicate that the corresponding dampers 130 are closed. As illustrated in FIG. 9A, the status LEDs 152 emit a red light, as indicated by the "R," to indicate that the corresponding damper 130 is closed. For example, the status LED 152 corresponding to the first, second, third, and fourth dampers 131, 132, 133, and 134 emit the red light to indicate that each of the first, second, third, and fourth dampers 131, 132, 133, and 134 are each closed. It should be understood that the status LED 152 may flash or emit any light scheme to indicate that the corresponding damper 130 is closed.

Turning to FIG. 8, depicted is a flow diagram of a process 206 for executing the Hardware Test Mode of FIG. 7, in accordance with an embodiment of the present disclosure. When the Hardware Test Mode is initiated, the control board 48 may cause the status LEDs 152 to flash (process block 300) or execute a light scheme to indicate that the status LEDs 152 are functioning and receiving control commands from the control board. For example, turning to FIG. 9B, in response to the control board 48 instructing the status LEDs 152 to flash (process block 300) or execute the light scheme, the status LEDs 152 may transition from red, as indicated by the letter "R," to green, as indicated by the letter "G." For example, the status LEDs 152 may flash on and off at a rate of ten green blinks per second for any suitable time, for example, thirty seconds. After the suitable time duration, the status LEDs 152 may stop flashing and turn off. Flashing (process block 300) the status LEDs 152 at the beginning of initiating the Hardware Test Mode may enable the technicians to more easily identify faulty status LEDs 152. For example, while the control board 48 instructs the status LEDs 152 to flash, the technician may identify any status LEDs 152 that do not flash. In some instances, when the status LEDs 152 do not flash when the control board 48 instructs the status LEDs to flash (process block 300), the status LEDs 152 or their associated signal traces may be faulty and require servicing or replacement. In a similar manner, when the status LEDs 152 all flash (process block 300) in accordance with the control commands from the control board 48, the status LEDs may be properly operating. In some embodiments, selection of the first selectable feature 221 from the technician menu 210 of FIG. 9B causes the control board to instruct the status LEDs 152 to flash (process block 300) to facilitate identification of faulty status LEDs 152.

Turning back to FIG. 8, executing (process block 206) the Hardware Test Mode includes flashing (process block 302) the communication LEDs 150. In some embodiments, when the Hardware Test Mode is initiated and after the status LEDs 152 flash (process block 300), the control board 48 may cause the communication LEDs 150 to flash (process block 302) or execute a light scheme to indicate that the communication LEDs 150 are functioning and/or receiving control commands from the control board 48. For example, turning to FIG. 9C, in response to the control board 48 instructing the communication LEDs 150 to flash (process block 302) or execute the light scheme, the communication LEDs 150 may transition from red, as indicated by the letter "R," to green, as indicated by the letter "G." For example, the communication LEDs 150 may flash on and off at a rate of ten green blinks per second for any suitable time duration, for example, thirty seconds. After the suitable time duration, the communication LEDs 150 may stop flashing and turn off. Flashing (process block 302) the communication LEDs 150 at the beginning of initiating the Hardware Test Mode may enable the technicians to more easily identify faulty communication LEDs 150. For example, while the control board 48 instructs the communication LEDs 150 to flash, the technician may identify any communication LEDs 150 that do not flash. In some instances, when the communication LEDs 150 do not flash when the control board 48 instructs the communication LEDs 150 to flash (process block 302), the communication LEDs 150 or their associated signal traces may be faulty and require servicing or replacement. In a similar manner, when the communication LEDs 150 all flash (process block 302) in accordance with the control commands from the control board 48, the communication LEDs 150 may be properly operating. In some embodiments, selection of the second selectable feature 222 from the technician menu 210 of FIG. 9C causes the control board to instruct the communication LEDs 150 to flash (process block 302) to facilitate identification of inoperable communication LEDs 150.

In some instances, it may be beneficial to identify the inoperable communication LEDs 150 and status LEDs 152 to ensure that the communication LEDs 150 and status LEDs 152 are properly functioning before using the communication LEDs 150 and status LEDs 152 to determine whether the dampers 130 are properly function so that they may be facilitate diagnosis of the dampers 130. For example, when the status LEDs 152 do not flash in accordance with the control command when the corresponding damper 130 is instructed to open, the signal trace associated with delivering electrical power to the corresponding damper 130 and the status LED 152 may be faulty. Alternatively, if the status LEDs flashes in accordance with the control command when the corresponding damper 130 is instructed to open, but the corresponding damper 130 does not open, the corresponding damper 130 may be faulty since the status LED 152 is receiving electrical power, but the corresponding damper 130 is not.

Turning to FIG. 9A, in some embodiments, the Hardware Test Mode may be initiated by selecting the Hardware Test Mode selectable feature 220 from the technician menu 210, whereby the process 206 of FIG. 8 is executed. In some embodiments, the steps of flashing (process block 300) the status LEDs 152 and flashing (process block 302) the communication LEDs 150 may be executed by selecting the first and second selectable features 221, 222, respectively. However, it should be understood that in some embodiments, the process 206, including the steps of flashing (process block 300) the status LEDs 152 and flashing (process block 302) the communication LEDs 150, may be executed by selecting the Hardware Test Mode selectable feature 220.

Turning back to FIG. 8, executing the Hardware Test Mode may include sequentially selecting (process block 304) a zone for actuation. As mentioned above, in some embodiments, each zone may include one or more dampers 130 that may open or close in accordance with a control command to help achieve desired operating conditions, such as temperature. The damper(s) 130 in each zone may each include a switch device 108 (FIG. 5), such as a solid-state relay, to control motion of the dampers 130 to enable the dampers 130 to open or close in accordance with the control command by regulating electrical power to the dampers 130. In response to selection (process block 304) of the zone for actuation, the control board 48 may instruct the damper(s) 130 corresponding to the selected zone to open (process block 304). Furthermore, the control board 48 may instruct the damper(s) 130 corresponding to the unselected zones to close (process block 308). While the damper(s) 130 corresponding to the selected zones open (process block 306), and while the dampers 130 corresponding to the unselected zones close (process block 308), the status LEDs 152 corresponding to the open dampers 130 of the selected zone flash in an open status indication light pattern (process block 310) and the status LEDs 152 corresponding to the closed dampers 130 of the unselected zones flash in a closed status indication light pattern (process 312).

In some embodiments, while the status LEDs 152 and dampers 130 are being instructed to actuate as previously mentioned, a technician may measure the voltage corresponding to the dampers 130, status LEDs, or any combination thereof, to facilitate diagnosis of the dampers 130. For example, when the status LEDs 152 flash in accordance with the open status indication light pattern in response to the corresponding damper 130 being instructed to open, but the corresponding damper 130 does not open, the corresponding damper 130 may be faulty since the status LED 152 is receiving electrical power, but the corresponding damper 130 is not. To further ensure this is the case, a technician may measure the voltage of the damper 130 instructed to open and the associated electrical components, such as signal traces, switch devices 108, and the like, while the corresponding status LED 152 flashes in accordance with the open status indication light pattern. While the discussion herein is focused on actuation of dampers 130 based on selected zones, in some embodiments, the actuation of dampers 130, causing the dampers 130 to open or close, may be based on individually selected dampers 130.

The open status indication light pattern may include flashing the status LED 152 in a green light pattern, on and off, at a rate of two pulses per second, which may serve as a visual indication to the technician that the corresponding damper 130 is opening or is open (process block 308). As mentioned above, the technician may verify this by measuring electrical characteristics associated with the damper 130, while the corresponding status LED 152 flashes in accordance with the open status indication light pattern. Additionally, the closed status indication light pattern may include flashing the status LED 152 in a red light pattern, on and off, at a rate of two pulses per second, which may serve as a visual indication that the corresponding damper 130 is closing or is closed (process block 308). Further, in some embodiments, the technician menu 210 of the control board 48 may present additional data to indicate which dampers 130 are opening and which dampers 130 are closing. For example, the technician menu 210 may indicate a status each damper 130, which zone has been selected (process block 304) for actuation, which dampers 130 are opening (process block 306), which dampers 130 are closing (process block 308), and other suitable information about the Hardware Test Mode. As such, the control board 48 may include a dual visual inspection system realized, first, via the flashing of the status LEDs 152, and second, via the display that presents the technician menu 210.

In some embodiments, the status LEDs 152 corresponding to the open dampers 130 of the selected zone flash the open status indication light pattern (process block 310) and the status LEDs 152 corresponding to the closed dampers 130 of the unselected zones flash in the closed status indication light pattern (process 312) until a transition time is reached (decision block 314). That is, the control board 48 may determine (decision block 314) if the transition time, for example, fifteen seconds, is reached. When the transition time is not reached, the status LED 152 corresponding to the open dampers 130 of the selected zone continue to flash the open status indication light pattern (process block 310) and the status LEDs 152 corresponding to the closed dampers 130 of the unselected zones continue to flash in the closed status indication light pattern (process 312). Alternatively, when the transition time is reached, a new zone is selected for actuation (process block 304) and the steps of process blocks 304-314 are sequentially repeated. The sequential selection of zones for opening and closing continues until a time limit, for example, ten minutes, has been reached or until power to the control board 48 is removed (decision block 316). That is, the control board 48 may determine whether the Hardware Test Mode time limit has been reached or whether the power has been removed (decision block 316). In some embodiments, when the time limit has been reached or when the power has been removed the Hardware Test Mode ends (process block 318), such that the communication and status LEDs 150, 152 turn off and the dampers 130 resume standard operation.

To help illustrate the process 206 of the Hardware Test Mode of FIG. 8, FIG. 10 is a schematic diagram of the control board of FIG. 6 executing the Hardware Test Mode of FIG. 7 at five different time instances. In the illustrated embodiment, at the first time instance, $t_1$, the control board 48 may not have received a signal indicative of starting the Hardware Test Mode. As such, the communication LEDs 150 and status LEDs 152 may, for example, be red, as indicated by the "R," to indicate that the dampers 130 are closed. In response to receipt (process block 202) of the signal indicative of initiating the Hardware Test Mode, in the illustrated embodiment, at the second time instance, $t_2$, the control board may start sequentially selecting a zone for actuation, in which the damper(s) 130 corresponding to the selected zone open (process block 306) and the damper(s) 130 corresponding to the unselected zone close or remain closed. In the illustrated embodiment, the control board 48 is communicatively coupled to four dampers 131, 132, 133, 134 and includes a status LED 152 corresponding to each damper 130. In the illustrated embodiment, at the second time instance, $t_2$ the first zone is selected for actuation and, in response, the corresponding damper, namely, the first damper 131, opens (process block 306) and the corresponding status LED 152 executes (process block 310) the open status indication light pattern. For example, the executing the open status indication light pattern may include flashing a green light on and off at a rate of two pulses per second. Furthermore, at the second time instance, $t_2$ the unselected dampers, namely the second, third, and fourth dampers 132, 133, 134 close (e.g., remain closed) (process block 308) and the corresponding status LEDs 152 execute (process block 312) the close status indication light pattern. For example, executing the closed status indication light pattern may include flashing a red light on and off at a rate of five pulses per second. The status LED 152 corresponding to the first damper 131 and the status LEDs 152 corresponding to the other unopened dampers 130 may execute their respective status indication light patterns until a transition time is reached (decision block 314). For example, the status LED 152 corresponding to the first damper 131 and the status LEDs 152 corresponding to the other unopened dampers 130 may execute their respective status indication light patterns for fifteen seconds.

Continuing this example, after the fifteen more seconds, at the third time instance, $t_3$, the control board 48 selects (process block 304) a new zone for actuation. In response, the newly selected corresponding damper, namely, the second damper 132, opens (process block 306) and the corresponding status LED 152 executes (process block 310) the open status indication light pattern. For example, as mentioned above, execution of the open status indication light pattern may include flashing a green light on and off at a rate of two pulses per second. Furthermore, at the third time instance, $t_3$ the unselected dampers, namely the first, third, and fourth dampers 131, 133, 134 close (process block 308) and the corresponding status LEDs 152 execute (process block 312) the close status indication light pattern. For example, executing the closed status indication light pattern may include flashing a red light on and off at a rate of five pulses per second. The status LED 152 corresponding to the second damper 132 and the status LEDs 152 corresponding to the other unopened dampers 130 may execute their respective status indication light patterns until a transition time is reached (decision block 314). For example, the status LED 152 corresponding to the second damper 132 and the status LEDs 152 corresponding to the other unopened dampers 130 may execute their respective status indication light patterns for fifteen seconds.

Continuing this example, after the fifteen more seconds, at the fourth time instance, $t_4$, the control board 48 selects (process block 304) a new zone for actuation. In response, the newly selected corresponding damper, namely, the third damper 133, opens (process block 306) and the corresponding status LED 152 executes (process block 310) the open status indication light pattern. For example, as mentioned above, execution of the open status indication light pattern may include flashing a green light on and off at a rate of two pulses per second. Furthermore, at the fourth time instance, $t_4$ the unselected dampers, namely the first, second, and fourth dampers 131, 132, 134 close (process block 308) and the corresponding status LEDs 152 execute (process block 312) the close status indication light pattern. For example, executing the closed status indication light pattern may include flashing a red light on and off at a rate of five pulses per second. The status LED 152 corresponding to the third damper 133 and the status LEDs 152 corresponding to the other unopened dampers 130 may execute their respective status indication light patterns until a transition time is reached (decision block 314). For example, the status LED 152 corresponding to the third damper 133 and the status LEDs 152 corresponding to the other unopened dampers 130 may execute their respective status indication light patterns for fifteen seconds.

Continuing this example, after the fifteen more seconds, at the fifth time instance, $t_5$, the control board 48 selects (process block 304) a new zone for actuation. In response, the newly selected corresponding damper, namely, the fourth damper 134, opens (process block 306) and the corresponding status LED 152 executes (process block 310) the open status indication light pattern. For example, as mentioned above, execution of the open status indication light pattern may include flashing a green light on and off at a rate of two pulses per second. Furthermore, at the fifth time instance, $t_5$ the unselected dampers, namely the first, second, and third dampers 131, 132, 133 close (process block 308) and the corresponding status LEDs 152 execute (process block 312) the close status indication light pattern. For example, executing the closed status indication light pattern may include flashing a red light on and off at a rate of five pulses per second. The status LED 152 corresponding to the fourth damper 134 and the status LEDs 152 corresponding to the other unopened dampers 130 may execute their respective status indication light patterns until a transition time is reached (decision block 314). For example, the status LED 152 corresponding to the fourth damper 134 and the status LEDs 152 corresponding to the other unopened dampers 130 may execute their respective status indication light patterns for fifteen seconds.

In some embodiments, after every periodic time duration, for example, every fifteen seconds, the control board 48 may determine (decision block 316) whether a time limit has been reached or whether power to the control board 48 has been removed. For example, the time limit may be ten minutes or any other suitable time duration. In response to the ten minute time limit not being reached, the control board 48 proceeds by selecting (process block 304) a new zone for actuation. Continuing the example above, after the status LED 152 corresponding to the fourth damper 134 and the status LEDs 152 corresponding to the other unopened dampers 130 execute their respective status indication light patterns for fifteen seconds, the control board may repeat this cycle for the first damper 131 and the corresponding status LED 152. That is, in some embodiments, the control board 48 opens the damper 130 of a selected zone, flashes the status LED 152 for the selected zone with an open status indication light pattern, closes the dampers 130 of the unselected zone(s), and flashes the status LEDs 152 of the unselected zones with a closed status indication light pattern until the time limit has been reached or until the power to the control board 48 has been removed, for example, by a technician.

Figure 11:
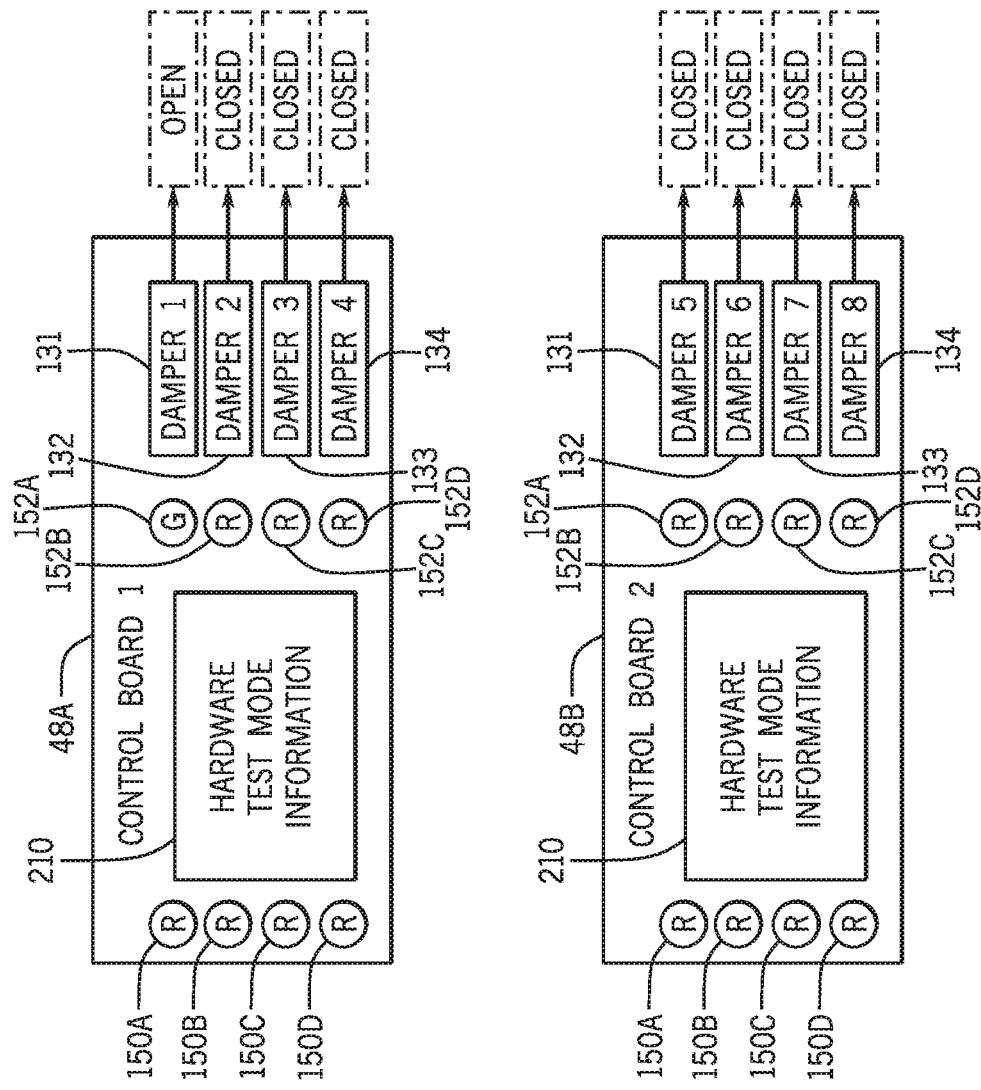
FIG. 11 is a schematic diagram of a plurality of the control boards of FIG. 6 executing the Hardware Test Mode of FIG. 7, in accordance with an embodiment of the present disclosure.

While the discussion of FIG. 10 focused on one control board 48 communicatively coupled to four zones, such that each zone includes a respective damper 130, it should be understood that the process 206 of FIG. 8 may be employed by any number of control boards 48 communicatively coupled to one another and to any number of respective zones, such that each zone includes any number of dampers 130. To help illustrate, FIG. 11 is a schematic diagram of the Hardware Test Mode of FIG. 7 executed on a plurality of the control boards 48 of FIG. 6. In the illustrated embodiment, each of the two control board 48A, 48B is communicatively coupled to four dampers 130. While executing the Hardware Test Mode, the zones sequentially selected for actuation may start with the first zone and the corresponding first damper being selected for actuation, and proceed with the second, third fourth fifth, sixth, seventh, and eighth after the transition time is reached.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system, comprising:
   one or more hardware processors; and
   a non-transitory memory, the non-transitory memory storing computer-readable instructions that, when executed by the one or more hardware processors, cause the one or more hardware processors to perform operations comprising:
   identifying a pre-determined transition time associated with transitioning between a plurality of dampers to actuate a damper of the plurality of dampers;
   selecting the damper for actuation;
   instructing the damper to open;
   causing one or more dampers corresponding to an unselected damper of the plurality of dampers to close or remain closed;
   causing a first status indicator corresponding to the damper to generate a first indication in response to instructing the damper to open;
   causing a second status indicator corresponding to the one or more dampers to generate a second indication in response to causing the one or more dampers to close or remain closed; and
   sequentially selecting a subsequent damper of the plurality of dampers for actuation after the pre-determined transition time.

2. The system of claim 1, wherein the operations comprise causing the first status indicator and the second status indicator to generate a third indication to facilitate determination of whether the first status indicator and the second status indicator operate in accordance with a control signal.

3. The system of claim 2, wherein an indication of fault of the first status indicator is provided in response to the first status indicator failing to operate in accordance with the control signal, and wherein an indication of fault of the second status indicator is provided in response to the second status indicator failing to operate in accordance with the control signal.

4. The system of claim 2, wherein an indication of proper operation of the first status indicator is provided in response to the first status indicator operating in accordance with the control signal, and wherein an indication of proper operation of the second status indicator is provided in response to the second status indicator operating in accordance with the control signal.

5. The system of claim 1, wherein sequentially selecting the subsequent damper for actuation comprises sequentially selecting a new subsequent damper of the plurality of dampers for actuation until a time limit is reached, until the plurality of dampers has been actuated, or both.

6. The system of claim 1, comprising a display communicatively coupled to the one or more hardware processors, wherein the display is configured to present:
   an indication indicating whether each damper of the plurality of dampers is closed or open;
   a clock indicative of a first time until the pre-determined transition time is reached;
   a second clock indicative of a time limit; or
   any combination thereof.

7. The system of claim 1, wherein the first status indicator and the second status indicator each comprise a respective light source, wherein the respective light source is connected in parallel to a respective damper of the plurality of dampers.

8. The system of claim 1, wherein the plurality of dampers corresponds to a plurality of zones of a heating, ventilation, and air conditioning (HVAC) system.

9. The system of claim 1, wherein the first status indicator provides an indication associated with electrical parameters associated with the damper corresponding to a selected building zone.

10. The system of claim 1, wherein an indication that the damper is operating outside target operating conditions is generated when the first indication is generated and the damper remains closed.

11. The system of claim 1, wherein an indication that the damper is properly operating is generated when the first indication is generated and the damper opens.

12. The system of claim 1, wherein the operations are performed in response to receiving a request to initiate a testing mode.

13. A non-transitory, computer-readable medium comprising computer-readable code, that when executed by one or more processors, causes the one or more processors to perform operations comprising:
    identifying a pre-determined transition time associated with transitioning between a plurality of dampers to actuate a damper of the plurality of dampers;
    selecting the damper for actuation;
    instructing the damper to open;
    causing one or more dampers corresponding to an unselected damper of the plurality of dampers to close or remain closed;
    causing a first status indicator corresponding to the damper to execute a first indication scheme in response to instructing the damper to open;
    causing a second status indicator corresponding to the one or more dampers to execute a second indication scheme in response to causing the one or more dampers to close or remain closed; and
    sequentially selecting a subsequent damper of the plurality of dampers for actuation in response to lapse of the pre-determined transition time.

14. The non-transitory, computer-readable medium of claim 13, wherein the operations comprise instructing a display to present a status indicating whether each damper of the plurality of dampers is closed or open, a first clock indicative of a first time until the pre-determined transition time is reached, a second clock indicative of a time limit, or any combination thereof.

15. The non-transitory, computer-readable medium of claim 13, wherein the operations comprise causing the first status indicator and the second status indicator to execute a third indication scheme to facilitate determination of whether the first status indicator and the second status indicator operate in accordance with a control signal.

16. The non-transitory, computer-readable medium of claim 13, wherein sequentially selecting the subsequent damper for actuation comprises sequentially selecting a new subsequent damper of the plurality of dampers for actuation until a time limit is reached, until the plurality of dampers has been actuated, or both.

17. The non-transitory, computer-readable medium of claim 13, wherein the operations are performed in response to receiving a request to initiate a testing mode.

18. A method for facilitating diagnosis of components in a heating, ventilation, and air conditioning (HVAC) system, the method comprising:
    identifying a pre-determined transition time associated with transitioning between a plurality of hardware components to actuate a hardware component of the plurality of hardware components;
    selecting the hardware component for actuation;
    starting a first clock indicative of a first time until the pre-determined transition time is reached;
    starting a second clock indicative of a time limit;
    instructing the hardware component to change from a first state to a second state;
    causing one or more hardware components corresponding to one or more unselected hardware components of the plurality of hardware components to change from the second state to the first state, or remain in the first state;
    causing a first status indicator corresponding to the hardware component to execute a first indication scheme in response to instructing the hardware component to change from the first state to the second state;
    causing a second status indicator corresponding to the one or more hardware components to execute a second indication scheme in response to causing the one or more hardware components to change from the second state to the first state, or remain in the first state; and
    sequentially selecting a subsequent hardware component of the plurality of hardware components for actuation in response to lapse of the pre-determined transition time.

19. The method of claim 18, wherein the first state corresponds to a closed state, and wherein the second state corresponds to an open state.

20. The method of claim 18, wherein sequentially selecting the subsequent hardware component for actuation comprises sequentially selecting a new subsequent hardware component of the plurality of hardware components for actuation until the plurality of hardware components has been actuated, until the time limit of the second clock is reached, or both.

* * * * *